United States Patent
Wang et al.

(10) Patent No.: US 11,736,608 B2
(45) Date of Patent: Aug. 22, 2023

(54) CALL CONTROL METHOD AND APPARATUS, AND STORAGE MEDIUM AND TERMINAL DEVICE

(71) Applicant: HuiZhou TCL Mobile Communication Co., Ltd., Guangdong (CN)

(72) Inventors: Dapeng Wang, Guangdong (CN); Haiying He, Guangdong (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 57 days.

(21) Appl. No.: 17/608,271

(22) PCT Filed: Nov. 29, 2019

(86) PCT No.: PCT/CN2019/121816
§ 371 (c)(1),
(2) Date: Nov. 2, 2021

(87) PCT Pub. No.: WO2021/042598
PCT Pub. Date: Mar. 11, 2021

(65) Prior Publication Data
US 2022/0210269 A1  Jun. 30, 2022

(30) Foreign Application Priority Data
Sep. 5, 2019 (CN) .......................... 201910835192.0

(51) Int. Cl.
*H04M 3/00* (2006.01)
*H04M 5/00* (2006.01)
*H04M 3/42* (2006.01)

(52) U.S. Cl.
CPC ............................ *H04M 3/42365* (2013.01)

(58) Field of Classification Search
CPC ............ H04M 1/72442; H04M 1/724; H04M 1/72427; H04M 1/72436; H04M 3/42042;
(Continued)

(56) References Cited

U.S. PATENT DOCUMENTS 8,385,884 B1 * 2/2013 Hertzfeld .......... H04M 3/42382
455/565
8,649,829 B1   2/2014 Pan
(Continued)

FOREIGN PATENT DOCUMENTS

CN      1885873      12/2006
CN    101668064       3/2010
(Continued)

OTHER PUBLICATIONS

International Search Report and the Written Opinion dated May 27, 2020 From the International Searching Authority Re. Application No. PCT/CN2019/121816 and Its Translation of Search Report Into English. (9 Pages).
(Continued)

*Primary Examiner* — Kharye Pope (57) ABSTRACT

Disclosed are a call control method and apparatus, and a storage medium and a terminal device. The call control method comprises: receiving a call access request, the call access request carrying a user identifier of an incoming call user; obtaining the current operation mode of a terminal device according to the call access request; determining whether the operation mode is a night mode or not; and if yes, controlling the terminal device to perform call connection according to a preset white list and the user identifier.

17 Claims, 4 Drawing Sheets

(58) Field of Classification Search
CPC ......... H04M 2201/50; H04M 1/72454; H04M 1/72484; H04M 3/42059; H04M 1/72439; H04M 3/436; H04M 1/2746; H04M 2250/60; H04M 3/42382; H04M 15/58; H04M 15/41; H04M 3/2218; H04M 2203/551; H04M 1/663; H04M 2215/0164; H04N 21/4126; H04N 21/4882; H04N 21/41407; H04Q 2213/13091; H04Q 3/72; H04Q 2213/13256; H04W 68/00; H04W 52/027; H04W 68/005
See application file for complete search history.

(56) References Cited

U.S. PATENT DOCUMENTS

| | | | | |
|---|---|---|---|---|
| 10,212,279 | B1* | 2/2019 | Adinarayan | H04M 3/436 |
| 2006/0182248 | A1* | 8/2006 | Smith | H04M 19/041 |
| | | | | 379/201.01 |
| 2006/0233330 | A1 | 10/2006 | Trell | |
| 2008/0039152 | A1* | 2/2008 | Arisawa | H04M 19/04 |
| | | | | 455/567 |
| 2008/0298575 | A1* | 12/2008 | Rondeau | H04M 3/436 |
| | | | | 379/211.01 |
| 2009/0168608 | A1* | 7/2009 | Lan | G04G 15/003 |
| | | | | 368/10 |
| 2009/0323907 | A1* | 12/2009 | Gupta | H04M 3/42365 |
| | | | | 379/88.13 |
| 2012/0246245 | A1* | 9/2012 | Nilsson | H04M 1/72457 |
| | | | | 709/224 |
| 2014/0241517 | A1* | 8/2014 | Varoglu | H04L 51/224 |
| | | | | 379/201.01 |
| 2014/0253320 | A1* | 9/2014 | Bender | H04M 1/72451 |
| | | | | 340/521 |
| 2016/0173683 | A1* | 6/2016 | Abreu | H04L 51/224 |
| | | | | 455/414.1 |
| 2018/0090104 | A1* | 3/2018 | Song | G09G 5/10 |
| 2018/0302511 | A1* | 10/2018 | Chen | B60R 25/305 |

FOREIGN PATENT DOCUMENTS

| | | |
|---|---|---|
| CN | 104023121 | 9/2014 |
| CN | 105072270 | 11/2015 |
| CN | 106027363 | 10/2016 |
| CN | 106686253 | 5/2017 |
| CN | 107911553 | 4/2018 |
| CN | 108108090 | 6/2018 |
| GB | 2474439 | 6/2015 |
| JP | S57111197 | 7/1982 |

OTHER PUBLICATIONS

Notification of Office Action and Search Report dated Apr. 21, 2020 From the State Intellectual Property Office of the People's Republic of China Re. Application No. 2019108351192.0 and Its Translation Into English. (21 Pages).

Notice of Allowance dated Jan. 4, 2021 From the State Intellectual Property Office of the People's Republic of China Re. Application No. 2019108351192.0 and Its Translation Into English. (6 Pages).

* cited by examiner

CALL CONTROL METHOD AND APPARATUS, AND STORAGE MEDIUM AND TERMINAL DEVICE

RELATED APPLICATIONS

This application is a National Phase of PCT Patent Application No. PCT/CN2019/121816 having International filing date of Nov. 29, 2019, which claims the benefit of priority of Chinese Patent Application No. 201910835192.0 filed on Sep. 5, 2019. The contents of the above applications are all incorporated by reference as if fully set forth herein in their entirety.

FIELD AND BACKGROUND OF THE INVENTION

The present invention relates to a terminal, and more particularly, to a communication control method, device, storage medium and a terminal equipment.

As the development of the electronic technology and the mobile communication technology, smart phones or other mobile terminals become necessary equipments in our daily life.

Conventionally, a smart phone not only has a communication and text functions, but also has website navigation, camera, music, game and social media functions. Because the cell phone becomes smarter, people become more reliant on the cell phone. A lot of people heavily rely on the smart phone in their daily life. In order to improve the user experience, the smart phone has multiple operating modes, such as the day mode and the night mode. Here, the night mode is often activated when the user is taking a rest. However, the night mode is mainly used to adjust the backlight of the display panel and only has a simple function. This makes it difficult to guarantee that the user could have a comfortable environment for taking a rest.

SUMMARY OF THE INVENTION

Technical Problem

One objective of an embodiment of the present invention is to provide a communication control method, a device, a storage medium, and a terminal equipment, in order to enrich the night mode functions and improve the user experience.

Technical Solution

According to an embodiment of the present invention, a communication control method is disclosed. The communication control method comprises: receiving a call-in request carrying a user identification of a call-in user; obtaining a current operating mode of the terminal equipment according to the call-in request; determining whether the current operating mode is a night mode; and controlling the terminal equipment to perform a communication connection according to a predetermined list and the user identification if the current operating mode is the night mode.

Furthermore, the step of controlling the terminal equipment to perform the communication connection according to the predetermined list and the user identification comprises:
determining whether the user identification is in the predetermined list;
if the user identification is in the predetermined list, then allowing the terminal equipment to perform the communication connection; and
if the user identification is not in the predetermined list, then prohibiting the terminal equipment from performing the communication connection.

Furthermore, the communication control method further comprises following steps before the step of determining whether the user identification is in the predetermined list:
periodically counting call-in users within a time period and counting a call-in number of times and a communication time of each of the call-in users; and
determining user identifications included in the predetermined list according to the call-in number of times and the communication time of each of the call-in users.

Furthermore, the communication control method further comprises following steps before the step of allowing the terminal equipment to perform the communication connection:
detecting whether a front-end of the terminal equipment is performing a predetermined application;
if the front-end of the terminal equipment is performing the predetermined application, generating a communication confirmation window and displaying the communication confirmation window in a current display interface;
determining whether a user performs a confirmation operation through the communication confirmation window;
if the user performs the confirmation operation through the communication confirmation window, then allowing the terminal equipment to perform the communication connection; and
if the user does not perform the confirmation operation through the communication confirmation window, then prohibiting the terminal equipment from performing the communication connection.

Furthermore, the communication control method further comprises following steps after the step of prohibiting the terminal equipment from performing the communication connection:
determining a user level corresponding the user identification;
obtaining a predetermined response message and a call-in reminder period corresponding to the user level;
sending the predetermined response message to a terminal equipment of the user identification and start timing; and
performing a call-in reminder for a user according to a timing period and the call-in reminder period.

Furthermore, the communication control method further comprises following steps before the step of receiving the call-in request:
obtaining a current time and a current ambient luminance of the terminal equipment;
determining whether the current time is within a predetermined time period and the current ambient luminance is within a predetermined luminance range; and
if the current time is within the predetermined time period and the current ambient luminance is within the predetermined luminance range, then controlling the terminal equipment to enter into the night mode.

According to another embodiment of the present invention, a call-in control device used in a terminal equipment is disclosed. The call-in control device comprises:
a receiving module, configured to receive a call-in request carrying a user identification of a call-in user;
an obtaining module, configured to obtain a current operating mode of the terminal equipment according to the call-in request;

a determining module, configured to determine whether the current operating mode is a night mode; and a control module, configured to control the terminal equipment to perform a communication connection according to a predetermined list and the user identification if the determining module determines that the current operating mode is the night mode.

Furthermore, the control module comprises:

a determining unit, configured to determine whether the user identification is in the predetermined list;

an allowing unit, configured to allow the terminal equipment to perform the communication connection if the user identification is in the predetermined list;

a prohibiting unit, configured to prohibit the terminal equipment from performing the communication connection if the user identification is not in the predetermined list.

Furthermore, the determining unit is further configured to periodically count call-in users within a time period and counting a call-in number of times and a communication time of each of the call-in users and to determine user identifications included in the predetermined list according to the call-in number of times and the communication time of each of the call-in users.

Furthermore, the control module further comprises:

a confirmation unit, configured to detect whether a front-end of the terminal equipment is performing a predetermined application before allowing the terminal equipment to perform the communication connection; to generate a communication confirmation window and displaying the communication confirmation window in a current display interface if the front-end of the terminal equipment is performing the predetermined application; to determine whether a user performs a confirmation operation through the communication confirmation window; to allow the terminal equipment to perform the communication connection if the user performs the confirmation operation through the communication confirmation window; and to prohibit the terminal equipment from performing the communication connection if the user does not perform the confirmation operation through the communication confirmation window.

Furthermore, the control module further comprises:

a reminder unit, configured to determine a user level corresponding the user identification after the prohibiting unit prohibits the terminal equipment from performing the communication connection; to obtain a predetermined response message and a call-in reminder period corresponding to the user level; to send the predetermined response message to a terminal equipment of the user identification and start timing; and to perform a call-in reminder for a user according to a timing period and the call-in reminder period.

Furthermore, the call-in control device further comprises:

an entering module, configured to obtain a current time and a current ambient luminance of the terminal equipment before the receiving module receives the call-in request; to determine whether the current time is within a predetermined time period and the current ambient luminance is within a predetermined luminance range; and to control the terminal equipment to enter into the night mode if the current time is within the predetermined time period and the current ambient luminance is within the predetermined luminance range.

According to another embodiment of the present invention, a computer readable storage medium stores a plurality of software instructions executable by a processor to perform the communication control method as disclosed above.

According to another embodiment of the present invention, a terminal equipment includes a processor and a storage device electrically connected to the processor. The storage device stores data and a plurality of software instructions executable by a processor to perform the communication control method as disclosed above.

Advantageous Effects

In contrast to the conventional art, the communication control method, the device, the storage medium, the terminal equipment of an embodiment of the present invention could be used in the terminal equipment. the communication control method, the device, the storage medium, the terminal equipment receives a call-in request carrying a user identification of a call-in user, obtains a current operating mode of the terminal equipment according to the call-in request, determines whether the current operating mode is a night mode, and controls the terminal equipment to perform a communication connection according to a predetermined list and the user identification if the current operating mode is the night mode. Accordingly, the night mode functions could be enriched and the user experience could be improved.

BRIEF DESCRIPTION OF THE SEVERAL VIEWS OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF SPECIFIC EMBODIMENTS OF THE INVENTION

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

According to an embodiment of the present invention, a communication control method is disclosed. The communication control method comprises: receiving a call-in request carrying a user identification of a call-in user; obtaining a current operating mode of the terminal equipment according to the call-in request; determining whether the current operating mode is a night mode; and controlling the terminal equipment to perform a communication connection according to a predetermined list and the user identification if the current operating mode is the night mode.

Furthermore, the step of controlling the terminal equipment to perform the communication connection according to the predetermined list and the user identification comprises:

determining whether the user identification is in the predetermined list;

if the user identification is in the predetermined list, then allowing the terminal equipment to perform the communication connection; and if the user identification is not in the predetermined list, then prohibiting the terminal equipment from performing the communication connection.

Furthermore, the communication control method further comprises following steps before the step of determining whether the user identification is in the predetermined list:

periodically counting call-in users within a time period and counting a call-in number of times and a communication time of each of the call-in users; and determining user identifications included in the predetermined list according to the call-in number of times and the communication time of each of the call-in users.

Furthermore, the communication control method further comprises following steps before the step of allowing the terminal equipment to perform the communication connection:

detecting whether a front-end of the terminal equipment is performing a predetermined application;

if the front-end of the terminal equipment is performing the predetermined application, generating a communication confirmation window and displaying the communication confirmation window in a current display interface;

determining whether a user performs a confirmation operation through the communication confirmation window;

if the user performs the confirmation operation through the communication confirmation window, then allowing the terminal equipment to perform the communication connection; and if the user does not perform the confirmation operation through the communication confirmation window, then prohibiting the terminal equipment from performing the communication connection.

Furthermore, the communication control method further comprises following steps after the step of prohibiting the terminal equipment from performing the communication connection:

determining a user level corresponding the user identification;

obtaining a predetermined response message and a call-in reminder period corresponding to the user level;

sending the predetermined response message to a terminal equipment of the user identification and start timing; and performing a call-in reminder for a user according to a timing period and the call-in reminder period.

Furthermore, the communication control method further comprises following steps before the step of receiving the call-in request:

obtaining a current time and a current ambient luminance of the terminal equipment;

determining whether the current time is within a predetermined time period and the current ambient luminance is within a predetermined luminance range; and if the current time is within the predetermined time period and the current ambient luminance is within the predetermined luminance range, then controlling the terminal equipment to enter into the night mode.

Figure 1:
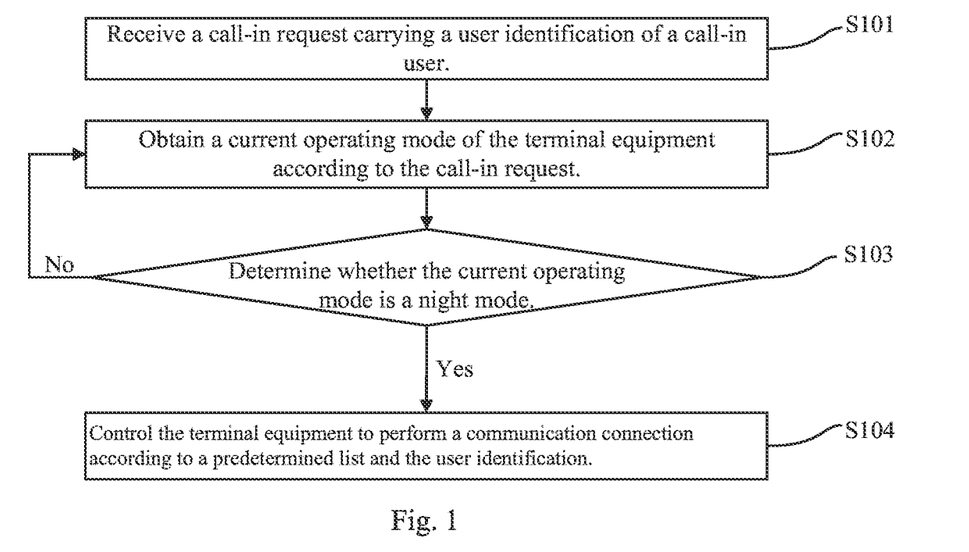
FIG. 1 is a flow chart of a communication control method according to an embodiment of the present invention.

Please refer to FIG. 1. FIG. 1 is a flow chart of a communication control method according to an embodiment of the present invention. The communication control method is used in a terminal equipment and could comprise following steps:

S101: Receiving a call-in request carrying a user identification of a call-in user.

In this embodiment, the call-in user could be a telephone call-in user or an audio/video call-in user through an instant communication application. The user identification comprises the cell phone number and/or instant communication application account, which could be used to identify the user. When the terminal equipment receives the call or the audio/video call, the call-in request could be generated.

Before the step S101, the communication control method could comprise: obtaining a current time and a current ambient luminance of the terminal equipment; determining whether the current time is within a predetermined time period and the current ambient luminance is within a predetermined luminance range; and if the current time is within the predetermined time period and the current ambient luminance is within the predetermined luminance range, then controlling the terminal equipment to enter into the night mode.

In this embodiment, the predetermined time period could be a manually preset fixed time period or a time period calculated by the terminal equipment based on the prior records of the time period that the terminal equipment was in the night mode. The predetermined luminance is used to determine whether the ambient environment is in a dusky condition. For example, if the ambient luminance is lower than the predetermined luminance, then it represents that the ambient environment is in a dusky condition.

S102: Obtaining a current operating mode of the terminal equipment according to the call-in request.

The operation mode could comprise multiple modes, such as a night mode, a day mode, an energy saving mode, and/or a non-disturbing mode.

S103: Determining whether the current operating mode is a night mode. If yes, then performing step S104.

Step 104: Controlling the terminal equipment to perform a communication connection according to a predetermined list and the user identification.

The above step S104 could comprise: determining whether the user identification is in the predetermined list; if the user identification is in the predetermined list, then allowing the terminal equipment to perform the communication connection; and if the user identification is not in the predetermined list, then prohibiting the terminal equipment from performing the communication connection.

In this embodiment, the predetermined list could be manually predetermined fixed list or a list predetermined by the terminal equipment according to the prior call-in conditions or communication frequencies. For example, the terminal equipment could periodically count the call-in users, the number of time of calling-in and communication time within a period of time and write the user identifications of those call-in users having a greater number of time of calling-in or longer communication time into the predetermined list. In this case, the predetermined list could be revised as time goes by. Specifically, the step of allowing the terminal equipment to perform the communication connection is to display the communication connection interface to the user. The step of prohibiting the terminal equipment from performing the communication connection is not to display the communication connection interface to the user.

For example, before the step of "allowing the terminal equipment to perform the communication connection," the communication control method could further comprise: detecting whether a front-end of the terminal equipment is performing a predetermined application; if yes, then generating a communication confirmation window and displaying the communication confirmation window in a current display interface; determining whether a user performs a confirmation operation through the communication confirmation window; if the user performs the confirmation operation through the communication confirmation window, then allowing the terminal equipment to perform the communication connection; and if the user does not perform the confirmation operation through the communication confirmation window, then prohibiting the terminal equipment from performing the communication connection.

Figure 2:
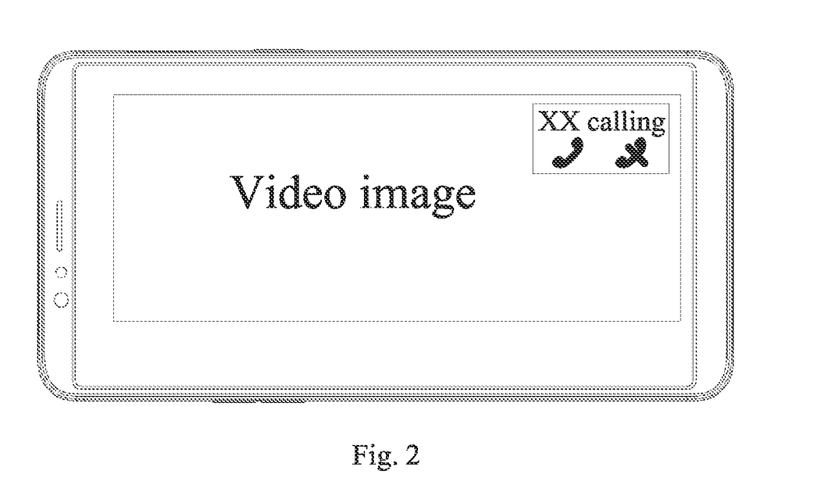
FIG. 2 is a diagram of a communication confirmation window in a current display interface according to an embodiment of the present invention.

The predetermined application could be manually preset and could comprise those which cannot be interrupted, such as games or video playing applications. The communication confirmation window could be displayed as a floating window in the current display interface. The size of the communication confirmation window could be decided according to the size of the display panel. For example, it could be ⅟₁₀ of the display panel and could be placed in any position of the display interface, such as the right upper corner or left bottom corner. The communication confirmation window could be used to display related information of the call-in user and multiple selection buttons. Here, the related information could comprise the name of the call-in user, and the selection buttons could comprise two buttons to accept or to reject the connection. Please refer to FIG. 2. FIG. 2 is a diagram of a communication confirmation window in a current display interface according to an embodiment of the present invention. The communication confirmation window could show a text message "xx is calling" and the icons for accepting/rejecting the connection.

In addition, after prohibiting the terminal equipment from performing the communication connection, the communication control method could comprise: determining a user level corresponding the user identification; obtaining a predetermined response message and a call-in reminder period corresponding to the user level; sending the predetermined response message to a terminal equipment of the user identification and start timing; and performing a call-in reminder for a user according to a timing period and the call-in reminder period.

In this embodiment, the user level could comprise important, normal and unimportant. Normally, when the user adds a new user in the address book or the instant communication application, the user could also set the user level of the new user. Furthermore, the predetermined response message and the call-in reminder period could be manually set. In this embodiment, for a user of the important user level, such as a client or a family member, the predetermined response message could be "I am busy right now and will call you back as soon as possible." For a user of the unimportant user level, such as an unknown user, the predetermined response message could be null, which means that no response is needed. The call-in reminder period could be determined according to the user level. For example, if the call-in user is in the important user level, then the call-in reminder period could be shorter (the reminder frequency is higher). In contrast, for a user is in the unimportant user level, the call-in reminder period could be longer (the reminder frequency is lower). After that, when a timing period reaches the call-in reminder period, the user will be reminded of the call-in event of the call-in user to help the user remember the call-in event.

The communication method is used in the terminal equipment. The communication control method receives a call-in request carrying a user identification of a call-in user, obtains a current operating mode of the terminal equipment according to the call-in request, determines whether the current operating mode is a night mode, and controls the terminal equipment to perform a communication connection according to a predetermined list and the user identification if the current operating mode is the night mode. Accordingly, the night mode functions could be enriched and the user experience could be improved.

According to the method of the above embodiments, how the communication control method is implemented in the terminal equipment will be illustrated in the following disclosure.

Figure 3:
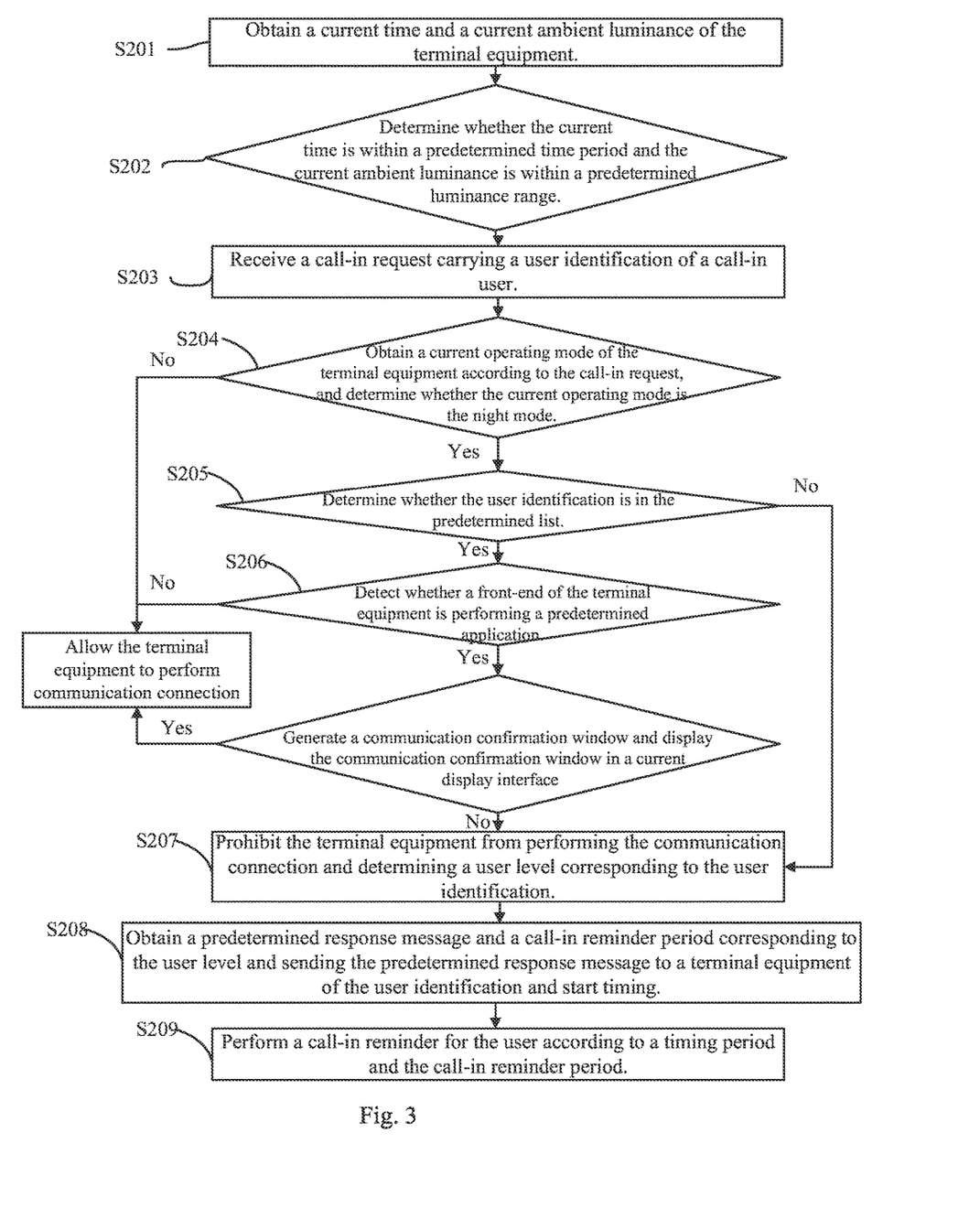
FIG. 3 is a flow chart of a communication control method according to another embodiment of the present invention.

Please refer to FIG. 3. FIG. 3 is a flow chart of a communication control method according to another embodiment of the present invention.

S201: Obtaining a current time and a current ambient luminance of the terminal equipment.

S202: Determining whether the current time is within a predetermined time period and the current ambient luminance is within a predetermined luminance range. If the current time is within the predetermined time period and the current ambient luminance is within the predetermined luminance range, then controlling the terminal equipment to enter into the night mode. If not, then performing step S201 again.

For example, the terminal equipment could determine the time period between 10 PM to 6 AM as the predetermined period and real-time detect the ambient luminance during the time period. Once the luminance is within the predetermined luminance range, then terminal equipment automatically enters into the night mode without the user's instruction.

S203: Receiving a call-in request carrying a user identification of a call-in user.

For example, the call-in user could be a telephone call-in user or an audio/video call-in user through an instant communication application. The user identification comprises the cell phone number and/or instant communication application account, which could be used to identify the user. When the terminal equipment receives the call or the audio/video call, the call-in request could be generated.

S204: Obtaining a current operating mode of the terminal equipment according to the call-in request. Determining whether the current operating mode is the night mode. If yes, then perform step S205. If not, then allowing the terminal equipment to perform a communication connection.

S205: Determining whether the user identification is in the predetermined list. If yes, then perform step S206. If not, then perform step S207.

For example, the terminal equipment could periodically count the call-in users, the number of time of calling-in and communication time within a period of time and write the user identifications of those call-in users having a greater number of time of calling-in or longer communication time into the predetermined list. If the terminal equipment is in the night mode, the terminal equipment could check whether the call-in user is in the predetermined list when receiving a call.

S206: Detecting whether a front-end of the terminal equipment is performing a predetermined application. If yes, then generating a communication confirmation window and displaying the communication confirmation window in a current display interface. Determining whether a user performs a confirmation operation through the communication confirmation window. If the user performs the confirmation operation through the communication confirmation window, then allowing the terminal equipment to perform the communication connection. If not, then perform step S207.

S207: Prohibiting the terminal equipment from performing the communication connection and determining a user level corresponding to the user identification.

For example, when the call-in user is in the predetermined list, the terminal equipment could perform the communication connection. When the call-in user is in the predetermined list, the terminal equipment could not perform the communication connection and remind the user of the call-in event. Before performing the communication connection, a communication confirmation window can be displayed to show related information of the call-in user and multiple selection buttons. Once the user chooses not to pick up the phone or does not choose in a certain period of time, then the terminal equipment determines not to accept the call-in. Otherwise, the terminal equipment accepts the call-in.

S208: Obtaining a predetermined response message and a call-in reminder period corresponding to the user level and sending the predetermined response message to a terminal equipment of the user identification and start timing.

S209: Performing a call-in reminder for the user according to a timing period and the call-in reminder period.

For example, the user level could comprise important, normal and unimportant. For example, if the call-in user is in the important user level, then the call-in reminder period could be shorter. In this way, if the timing period reaches the call-in reminder period, the user will be reminded of the call-in event of the call-in user to help the user remember the call-in event.

According to the method of the above embodiments, a call-in control device will be illustrated in the following disclosure. The call-in control device could be implemented as an independent entity.

According to another embodiment of the present invention, a call-in control device used in a terminal equipment is disclosed. The call-in control device comprises:

a receiving module, configured to receive a call-in request carrying a user identification of a call-in user;

an obtaining module, configured to obtain a current operating mode of the terminal equipment according to the call-in request;

a determining module, configured to determine whether the current operating mode is a night mode; and a control module, configured to control the terminal equipment to perform a communication connection according to a predetermined list and the user identification if the determining module determines that the current operating mode is the night mode.

Furthermore, the control module comprises:

a determining unit, configured to determine whether the user identification is in the predetermined list;

an allowing unit, configured to allow the terminal equipment to perform the communication connection if the user identification is in the predetermined list;

a prohibiting unit, configured to prohibit the terminal equipment from performing the communication connection if the user identification is not in the predetermined list.

Furthermore, the determining unit is further configured to periodically count call-in users within a time period and counting a call-in number of times and a communication time of each of the call-in users and to determine user identifications included in the predetermined list according to the call-in number of times and the communication time of each of the call-in users.

Furthermore, the control module further comprises:

a confirmation unit, configured to detect whether a front-end of the terminal equipment is performing a predetermined application before allowing the terminal equipment to perform the communication connection; to generate a communication confirmation window and displaying the communication confirmation window in a current display interface if the front-end of the terminal equipment is performing the predetermined application; to determine whether a user performs a confirmation operation through the communication confirmation window; to allow the terminal equipment to perform the communication connection if the user performs the confirmation operation through the communication confirmation window; and to prohibit the terminal equipment from performing the communication connection if the user does not perform the confirmation operation through the communication confirmation window.

Furthermore, the control module further comprises:

a reminder unit, configured to determine a user level corresponding the user identification after the prohibiting unit prohibits the terminal equipment from performing the communication connection; to obtain a predetermined response message and a call-in reminder period corresponding to the user level; to send the predetermined response message to a terminal equipment of the user identification and start timing; and to perform a call-in reminder for a user according to a timing period and the call-in reminder period.

Furthermore, the call-in control device further comprises:

an entering module, configured to obtain a current time and a current ambient luminance of the terminal equipment before the receiving module receives the call-in request; to determine whether the current time is within a predetermined time period and the current ambient luminance is within a predetermined luminance range; and to control the terminal equipment to enter into the night mode if the current time is within the predetermined time period and the current ambient luminance is within the predetermined luminance range.

Figure 4:
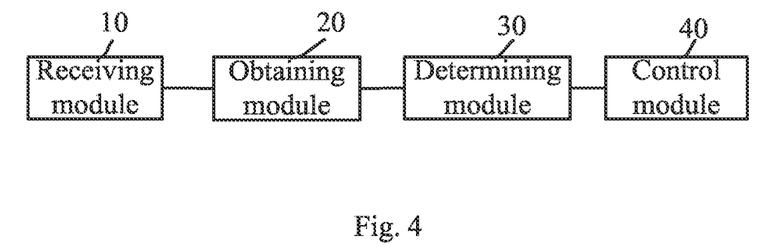
FIG. 4 is a diagram of a call-in control device according to an embodiment of the present invention.

Please refer to FIG. 4. FIG. 4 is a diagram of a call-in control device according to an embodiment of the present invention. The terminal equipment could comprise a cell phone, a tablet, a personal computer, SD card, etc. The terminal equipment could comprise: a receiving module 10, an obtaining module 20, a determining module 30 and a control module 40.

(1) Receiving Module 10:

The receiving module 10 is configured to receive a call-in request carrying a user identification of a call-in user.

In this embodiment, the call-in user could be a telephone call-in user or an audio/video call-in user through an instant communication application. The user identification comprises the cell phone number and/or instant communication application account, which could be used to identify the user. When the terminal equipment receives the call or the audio/video call, the call-in request could be generated.

Figure 5:
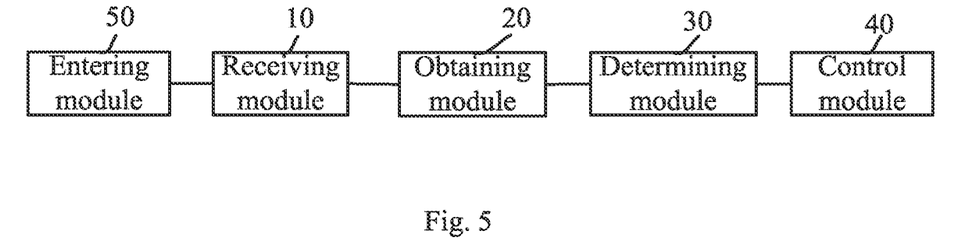
FIG. 5 is a diagram of a call-in control device according to another embodiment of the present invention.

For example, please refer to FIG. 5. FIG. 5 is a diagram of the call-in control device according to another embodiment of the present invention. The call-in control device further comprises an entering module 50. The entering module 50 is configured to obtain a current time and a current ambient luminance of the terminal equipment before the receiving module receives the call-in request; to determine whether the current time is within a predetermined time period and the current ambient luminance is within a predetermined luminance range; and to control the terminal equipment to enter into the night mode if the current time is within the predetermined time period and the current ambient luminance is within the predetermined luminance range.

In this embodiment, the predetermined time period could be a manually preset fixed time period or a time period calculated by the terminal equipment based on the prior records of the time period that the terminal equipment was in the night mode. The predetermined luminance is used to determine whether the ambient environment is in a dusky condition. For example, if the ambient luminance is lower than the predetermined luminance, then it represents that the ambient environment is in a dusky condition.

(2) The Obtaining Module 20:

The obtaining module 20 is configured to obtain a current operating mode of the terminal equipment according to the call-in request.

In this embodiment, the operation mode could comprise multiple modes, such as a night mode, a day mode, an energy saving mode, and/or a non-disturbing mode.

(3) The Determining Module 30:

The determining module 30 is configured to determine whether the current operating mode is a night mode.

(4) The Control Module 40:

The control module 40 is configured to control the terminal equipment to perform a communication connection according to a predetermined list and the user identification if the determining module determines that the current operating mode is the night mode.

Figure 6:
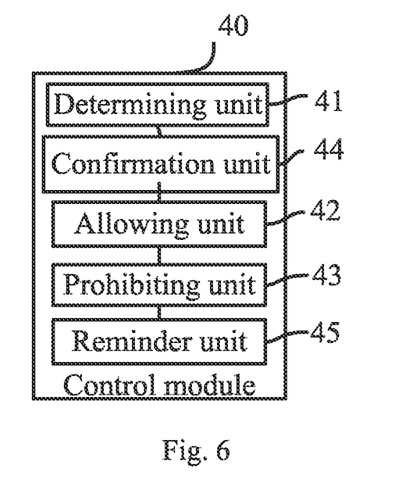
FIG. 6 is a diagram of a control module according to another embodiment of the present invention.

Please refer to FIG. 6. FIG. 6 is a diagram of a control module according to another embodiment of the present invention. The control module 40 comprises a determining unit 41, an allowing unit 42, and a prohibiting unit 43.

The determining unit 41 is configured to determine whether the user identification is in the predetermined list.

The allowing unit 42 is configured to allow the terminal equipment to perform the communication connection if the user identification is in the predetermined list.

The prohibiting unit 43 is configured to prohibit the terminal equipment from performing the communication connection if the user identification is not in the predetermined list.

In this embodiment, the predetermined list could be manually predetermined fixed list or a list predetermined by the terminal equipment according to the prior call-in conditions or communication frequencies. For example, the terminal equipment could periodically count the call-in users, the number of time of calling-in and communication time within a period of time and write the user identifications of those call-in users having a greater number of time of calling-in or longer communication time into the predetermined list. In this case, the predetermined list could be revised as time goes by. Specifically, the step of allowing the terminal equipment to perform the communication connection is to display the communication connection interface to the user. The step of prohibiting the terminal equipment from performing the communication connection is not to display the communication connection interface to the user.

The control module 40 further comprises a confirmation unit 44. The confirmation unit 44 is configured to detect whether a front-end of the terminal equipment is performing a predetermined application before allowing the terminal equipment to perform the communication connection; to generate a communication confirmation window and displaying the communication confirmation window in a current display interface if the front-end of the terminal equipment is performing the predetermined application; to determine whether a user performs a confirmation operation through the communication confirmation window; to allow the terminal equipment to perform the communication connection if the user performs the confirmation operation through the communication confirmation window; and to prohibit the terminal equipment from performing the communication connection if the user does not perform the confirmation operation through the communication confirmation window.

The predetermined application could be manually preset and could comprise those which cannot be interrupted, such as games or video playing applications. The communication confirmation window could be displayed as a floating window in the current display interface. The size of the communication confirmation window could be decided according to the size of the display panel. For example, it could be 1/10 of the display panel and could be placed in any position of the display interface, such as the right upper corner or left bottom corner. The communication confirmation window could be used to display related information of the call-in user and multiple selection buttons. Here, the related information could comprise the name of the call-in user, and the selection buttons could comprise two buttons to accept or to reject the connection. Please refer to FIG. 2. FIG. 2 is a diagram of a communication confirmation window in a current display interface according to an embodiment of the present invention. The communication confirmation window could show a text message "xx is calling" and the icons for accepting/rejecting the connection.

The control module 40 further comprises a reminder unit 45. The reminder unit 45 is configured to determine a user level corresponding the user identification after the prohibiting unit prohibits the terminal equipment from performing the communication connection; to obtain a predetermined response message and a call-in reminder period corresponding to the user level; to send the predetermined response message to a terminal equipment of the user identification and start timing; and to perform a call-in reminder for a user according to a timing period and the call-in reminder period.

In this embodiment, the user level could comprise important, normal and unimportant. Normally, when the user adds a new user in the address book or the instant communication application, the user could also set the user level of the new user. Furthermore, the predetermined response message and the call-in reminder period could be manually set. In this embodiment, for a user of the important user level, such as a client or a family member, the predetermined response message could be "I am busy right now and will call you back as soon as possible." For a user of the unimportant user level, such as an unknown user, the predetermined response message could be null, which means that no response is needed. The call-in reminder period could be determined according to the user level. For example, if the call-in user is in a high priority of the user level, then the call-in reminder period could be shorter (the reminder frequency is higher). In contrast, for a user is in the low priority of the user level, the call-in reminder period could be longer (the reminder frequency is lower). After that, when a timing period reaches the call-in reminder period, the user will be reminded of the call-in event of the call-in user to help the user remember the call-in event.

In the above embodiments, each element could be implemented as an independent entity or some elements could be combined as one or more entities. The implementation of the above units could be referred to the above-mentioned embodiments and further details are omitted here.

From the above, it could be understood that the call-in control device is used in the terminal equipment. The receiving module 10 receives a call-in request carrying a user identification of a call-in user. The obtaining module 20 obtains a current operating mode of the terminal equipment according to the call-in request. And then, the determining module 30 determines whether the current operating mode is a night mode. The control module 40 controls the terminal equipment to perform a communication connection according to a predetermined list and the user identification if the current operating mode is the night mode. Accordingly, the night mode functions could be enriched and the user experience could be improved.

Figure 7:
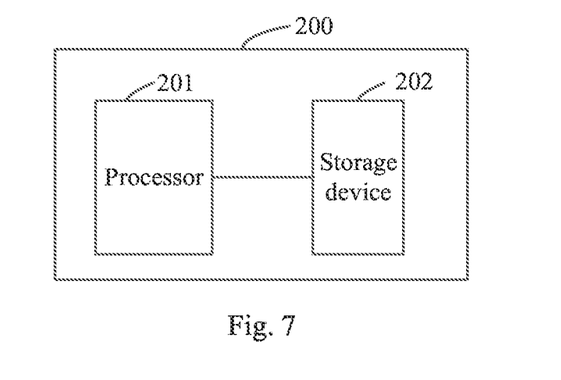
FIG. 7 is a diagram of a terminal equipment according to an embodiment of the present invention.

Furthermore, a terminal equipment is disclosed according to an embodiment of the present invention. The terminal equipment could be a smart phone, tablet, or any other devices. Please refer to FIG. 7. FIG. 7 is a diagram of a terminal equipment according to an embodiment of the present invention. As shown in FIG. 7, the terminal equipment 200 comprises a processor 201, a storage device 202. The processor 201 is electrically connected to the storage device 202.

The processor 201 is a control center of the terminal equipment 200. The processor 201 is connected to other components through all kinds of ports and buses. The processor 201 could load and execute the programs stored in the storage device 202 and could load the data stored in the storage device 202 to perform the functions and process the data of the terminal equipment. In this way, the processor 201 could perform a full control on the terminal equipment.

In this embodiment, the terminal equipment 200 has multiple storage sections, including a system section and a target section. The processor 201 of the terminal equipment 200 follows the following steps to load instructions corresponding to one or more programs into the storage device 202 and execute the programs stored in the storage device 202 to perform various functions:

Receiving a call-in request carrying a user identification of a call-in user; obtaining a current operating mode of the terminal equipment according to the call-in request; determining whether the current operating mode is a night mode; and if yes, then controlling the terminal equipment to perform a communication connection according to a predetermined list and the user identification.

Figure 8:
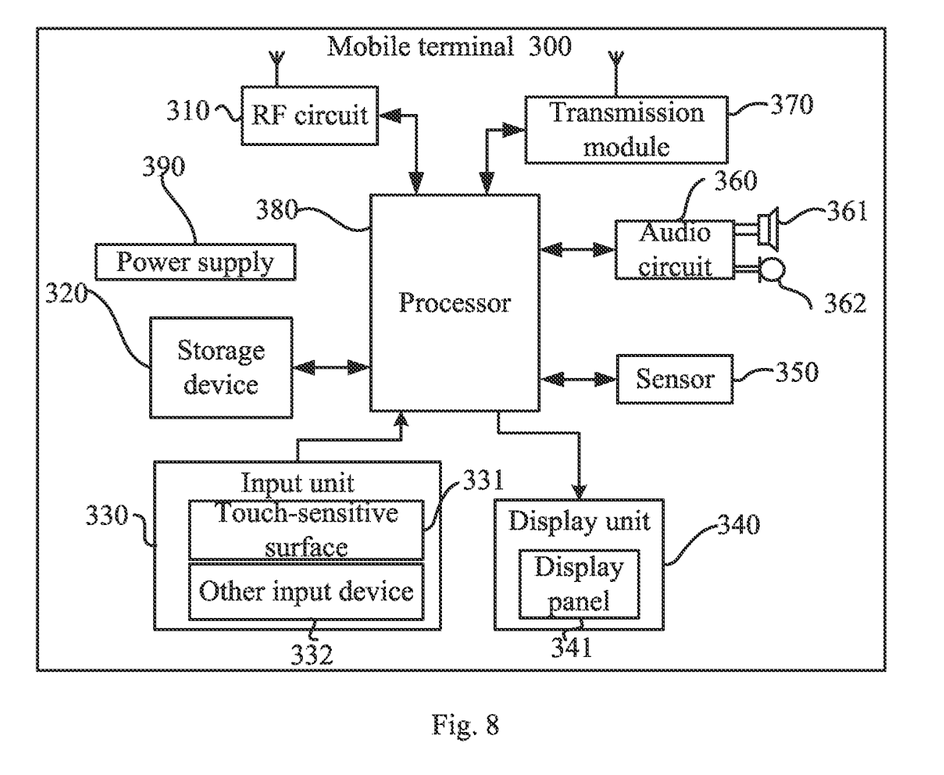
FIG. 8 is a diagram of a terminal equipment according to another embodiment of the present invention.

Please refer to FIG. 8. FIG. 8 is a diagram of a terminal equipment according to an embodiment of the present invention. The terminal equipment could be used to implement the communication control method of above-mentioned embodiments. The terminal equipment 300 could be a smart phone or a tablet.

The RF circuit 310 may be configured to receive and send a signal during an information receiving and sending process or a conversation process. Specifically, after receiving downlink information from a base station, the RF circuit 310 delivers the downlink information to one or more processors 380 for processing, and sends related uplink data to the base station. Generally, the RF circuit 310 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 310 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The storage device 320 may be configured to store a software instructions and module. The processor 380 runs the software instructions and module stored in the storage device 320, to implement various functional applications and data processing. The storage device 320 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the storage device 320 may include a high speed random access memory, and may also include a non-volatile memory, such as at least one magnetic disk storage device, a flash memory device, or another volatile solid-state storage device. Correspondingly, the storage device 320 may further include a memory controller, so that the processor 380 and the input unit 330 access the storage device 320.

The input unit 330 may be configured to receive input digit or character information, and generate keyboard, mouse, joystick, optical, or track ball signal input related to the user setting and function control. Specifically, the input unit 330 may include a touch-sensitive surface 331 and other input device 332. The touch-sensitive surface 331 may also be referred to as a touch screen or a touch panel, and may collect a touch operation of a user on or near the touch-sensitive surface (such as an operation of a user on or near the touch-sensitive surface by using any suitable object or attachment, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 380. Moreover, the touch controller can receive and execute a command sent from the processor 380. In addition, the touch-sensitive surface may be implemented by using various types, such as a resistive type, a capacitance type, an infrared type, and a surface sound wave type. In addition to the touch-sensitive surface, the input unit 330 may further include the another input device. Specifically, the another input device may include, but is not limited to, one or more of a physical keyboard, a functional key (such as a volume control key or a switch key), a track ball, a mouse, and a joystick.

The display unit 340 may be configured to display information input by the user or information provided for the user, and various graphical user ports of the mobile terminal. The graphical user ports may be formed by a graph, a text, an icon, a video, and any combination thereof. The display unit 340 may include a display panel 341. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 380, so as to determine a type of a touch event. Then, the processor 380 provides corresponding visual output on the display panel according to the type of the touch event. Although, in FIG. 4, the touch-sensitive surface and the display panel are used as two separate parts to implement input and output functions, in some embodiments, the touch-sensitive surface and the display panel may be integrated to implement the input and output functions.

The terminal equipment 300 may further include at least one sensor 350, such as an optical sensor, a motion sensor, and other sensors. Specifically, the optical sensor may include an ambient light sensor and a proximity sensor. The ambient light sensor may adjust luminance of the display panel 341 according to brightness of the ambient light. The proximity sensor may switch off the display panel 341 and/or backlight when the terminal equipment 300 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the terminal equipment 300 are not further described herein.

The audio circuit 360, a loudspeaker 361, and a microphone 362 may provide audio interfaces between the user and the terminal equipment 300. The audio circuit 360 may transmit, to the loudspeaker 361, a received electric signal converted from received audio data. The loudspeaker 361 converts the electric signal into a sound signal for output. On the other hand, the microphone 362 converts a collected sound signal into an electric signal. The audio circuit 360 receives the electric signal and converts the electric signal into audio data, and outputs the audio data to the processor 380 for processing. Then, the processor 380 sends the audio data to, for example, another terminal by using the RF circuit 310, or outputs the audio data to the storage device 320 for further processing. The audio circuit 360 may further include an earplug jack, so as to provide communication between a peripheral earphone and the terminal equipment 300.

The terminal equipment 300 may help, by using the transmission module 370 (e.g. Wi-Fi module), a user to receive and send an e-mail, browse a webpage, and access stream media, and the like, which provides wireless broadband Internet access for the user. Although FIG. 5 shows the transmission module 370, it may be understood that, the wireless communications unit is not a necessary component of the terminal equipment 300, and can be ignored according to demands without changing the scope of the essence of the present disclosure.

The processor 380 is a control center of the terminal equipment 300, and connects various parts of the terminal by using various interfaces and lines. By running or executing the software instructions and/or module stored in the storage device 320, and invoking data stored in the storage device 320, the processor 380 performs various functions and data processing of the terminal equipment 300, thereby performing overall monitoring on the mobile phone. Optionally, the processor 380 may include one or more processing cores. Preferably, the processor 380 may integrate an application processor and a modem. The application processor mainly processes an operating system, a user interface, an application program, and the like. The modem mainly processes wireless communication. It may be understood that, the foregoing modem may not be integrated into the processor 380.

The terminal equipment 300 further includes the power supply 390 (such as a battery) for supplying power to the components. Preferably, the power supply may be logically connected to the processor 380 by using a power supply management system, thereby implementing functions, such as charging, discharging, and power consumption management, by using the power supply management system. The power supply 390 may further include any component, such as one or more direct current or alternate current power supplies, a re-charging system, a power supply fault detection circuit, a power supply converter or an inverter, and a power supply state indicator.

The terminal equipment 300 could further comprise a camera (not shown), such as a front camera and a back camera, and a Bluetooth module (not shown) and further details are omitted. In this embodiment, the display unit of the terminal equipment is a touch panel. The terminal equipment further comprises a storage device and one or more software instructions. The one or more software instructions are stored in the storage device. One or more processors could execute the one or more software instructions to perform operations comprising:

receiving a call-in request carrying a user identification of a call-in user;

obtaining a current operating mode of the terminal equipment according to the call-in request;

determining whether the current operating mode is a night mode; and if the current operating mode is the night mode, controlling the terminal equipment to perform a communication connection according to a predetermined list and the user identification.

Furthermore, the operation of controlling the terminal equipment to perform the communication connection according to the predetermined list and the user identification comprises:

determining whether the user identification is in the predetermined list;

if the user identification is in the predetermined list, then allowing the terminal equipment to perform the communication connection; and if the user identification is not in the predetermined list, then prohibiting the terminal equipment from performing the communication connection.

Furthermore, before the operation of determining whether the user identification is in the predetermined list, the processor performs operations comprising:

periodically counting call-in users within a time period and counting a call-in number of times and a communication time of each of the call-in users; and determining user identifications included in the predetermined list according to the call-in number of times and the communication time of each of the call-in users.

Furthermore, before the operation of allowing the terminal equipment to perform the communication connection, the processor performs operations comprising:

detecting whether a front-end of the terminal equipment is performing a predetermined application;

if the front-end of the terminal equipment is performing the predetermined application, generating a communication confirmation window and displaying the communication confirmation window in a current display interface;

determining whether a user performs a confirmation operation through the communication confirmation window;

if the user performs the confirmation operation through the communication confirmation window, then allowing the terminal equipment to perform the communication connection; and if the user does not perform the confirmation operation through the communication confirmation window, then prohibiting the terminal equipment from performing the communication connection.

Furthermore, after the operation of prohibiting the terminal equipment from performing the communication connection, the processor performs operations comprising:

determining a user level corresponding the user identification;

obtaining a predetermined response message and a call-in reminder period corresponding to the user level;

sending the predetermined response message to a terminal equipment of the user identification and start timing; and performing a call-in reminder for a user according to a timing period and the call-in reminder period.

Furthermore, before the operation of receiving the call-in request, the processor performs operations comprising:

obtaining a current time and a current ambient luminance of the terminal equipment;

determining whether the current time is within a predetermined time period and the current ambient luminance is within a predetermined luminance range; and if the current time is within the predetermined time period and the current ambient luminance is within the predetermined luminance range, then controlling the terminal equipment to enter into the night mode.

In the actual implementation, each module could be implemented as an independent entity or multiple modules could be combined into one or more entities. The implementation of each module could be referred to the above-mentioned embodiments and further details are omitted here.

A person having ordinary skill in the art could understand that part of all the steps in the above-mentioned method could be completed through instructions or executing instruction to control related hardware. The instructions could be stored in a computer readable medium and loaded by a processor to execute. Accordingly, a storage medium is disclosed according to an embodiment of the present invention. The storage medium stores multiple instructions, which could be loaded and executed by a processor to perform any of the steps of any of the above-mentioned communication control methods.

The storage medium may include a Read Only Memory (ROM), a Random Access Memory (RAM), a magnetic disc or a compact disc.

Because the instructions stored in the storage medium could be executed to perform any of the steps of any of the above-mentioned communication methods. Accordingly, the objectives of any of the above-mentioned communication methods could be achieved. Since these operations and implementations had been discussed above, further details are omitted here.

The implementation of all the above operations/steps had been discussed in the above embodiments and thus further details are omitted here.

Above are embodiments of the present invention, which does not limit the scope of the present invention. Any modifications, equivalent replacements or improvements within the spirit and principles of the embodiment described above should be covered by the protected scope of the invention.

What is claimed is:

1. A communication control method, used in a terminal equipment, the communication control method comprising:
   obtaining a current time and a current ambient luminance of the terminal equipment;
   determining whether the current time is within a predetermined time period and the current ambient luminance is within a predetermined luminance range;
   if the current time is within the predetermined time period and the current ambient luminance is within the predetermined luminance range, then controlling the terminal equipment to enter into a night mode;
   receiving a call-in request carrying a user identification of a call-in user;
   obtaining a current operating mode of the terminal equipment according to the call-in request;
   determining whether the current operating mode is the night mode; and
   if the current operating mode is the night mode, controlling the terminal equipment to perform a communication connection according to a predetermined list and the user identification.

2. The communication control method of claim 1, wherein the step of controlling the terminal equipment to perform the communication connection according to the predetermined list and the user identification comprises:
   determining whether the user identification is in the predetermined list;
   if the user identification is in the predetermined list, then allowing the terminal equipment to perform the communication connection; and
   if the user identification is not in the predetermined list, then prohibiting the terminal equipment from performing the communication connection.

3. The communication control method of claim 2, further comprising following steps before the step of determining whether the user identification is in the predetermined list:
   periodically counting call-in users within a time period and counting a call-in number of times and a communication time of each of the call-in users; and
   determining user identifications included in the predetermined list according to the call-in number of times and the communication time of each of the call-in users.

4. The communication control method of claim 2, further comprising following steps before the step of allowing the terminal equipment to perform the communication connection:
   detecting whether a front-end of the terminal equipment is performing a predetermined application;
   if the front-end of the terminal equipment is performing the predetermined application, generating a communication confirmation window and displaying the communication confirmation window in a current display interface;
   determining whether a user performs a confirmation operation through the communication confirmation window;
   if the user performs the confirmation operation through the communication confirmation window, then allowing the terminal equipment to perform the communication connection; and
   if the user does not perform the confirmation operation through the communication confirmation window, then prohibiting the terminal equipment from performing the communication connection.

5. The communication control method of claim 2, further comprising following steps after the step of prohibiting the terminal equipment from performing the communication connection:
   determining a user level corresponding the user identification;
   obtaining a predetermined response message and a call-in reminder period according to the user level;
   sending the predetermined response message to a terminal equipment of the user identification and start timing; and
   performing a call-in reminder for a user according to a timing period and the call-in reminder period.

6. A call-in control device, used in a terminal equipment, the call-in control device comprising:
   an entering module, configured to obtain a current time and a current ambient luminance of the terminal equipment; to determine whether the current time is within a predetermined time period and the current ambient luminance is within a predetermined luminance range; and to control the terminal equipment to enter into a night mode if the current time is within the predetermined time period and the current ambient luminance is within the predetermined luminance range;
   a receiving module, configured to receive a call-in request carrying a user identification of a call-in user;
   an obtaining module, configured to obtain a current operating mode of the terminal equipment according to the call-in request;
   a determining module, configured to determine whether the current operating mode is the night mode; and
   a control module, configured to control the terminal equipment to perform a communication connection according to a predetermined list and the user identification if the determining module determines that the current operating mode is the night mode.

7. The call-in control device of claim 6, wherein the control module comprises:
   a determining unit, configured to determine whether the user identification is in the predetermined list;
   an allowing unit, configured to allow the terminal equipment to perform the communication connection if the user identification is in the predetermined list;
   a prohibiting unit, configured to prohibit the terminal equipment from performing the communication connection if the user identification is not in the predetermined list.

8. The call-in control device of claim 7, wherein the determining unit is further configured to periodically count call-in users within a time period and counting a call-in number of times and a communication time of each of the call-in users and to determine user identifications included in the predetermined list according to the call-in number of times and the communication time of each of the call-in users.

9. The call-in control device of claim 7, wherein the control module further comprises:
   a confirmation unit, configured to detect whether a front-end of the terminal equipment is performing a predetermined application before allowing the terminal equipment to perform the communication connection; to generate a communication confirmation window and displaying the communication confirmation window in a current display interface if the front-end of the terminal equipment is performing the predetermined application; to determine whether a user performs a confirmation operation through the communication confirmation window; to allow the terminal equipment to perform the communication connection if the user performs the confirmation operation through the communication confirmation window; and to prohibit the terminal equipment from performing the communication connection if the user does not perform the confirmation operation through the communication confirmation window.

10. The call-in control device of claim 7, wherein the control module further comprises:
    a reminder unit, configured to determine a user level corresponding the user identification after the prohibiting unit prohibits the terminal equipment from performing the communication connection; to obtain a predetermined response message and a call-in reminder period according to the user level; to send the predetermined response message to a terminal equipment of the user identification and start timing; and to perform a call-in reminder for a user according to a timing period and the call-in reminder period.

11. A terminal equipment comprising a processor and a storage device that is electrically connected to the processor and stores software instructions and data, wherein the processor, upon execution of the software instructions, performs operations comprising:
    obtaining a current time and a current ambient luminance of the terminal equipment;
    determining whether the current time is within a predetermined time period and the current ambient luminance is within a predetermined luminance range;
    if the current time is within the predetermined time period and the current ambient luminance is within the predetermined luminance range, then controlling the terminal equipment to enter into a night mode;
    receiving a call-in request carrying a user identification of a call-in user;
    obtaining a current operating mode of the terminal equipment according to the call-in request;
    determining whether the current operating mode is the night mode; and
    if the current operating mode is the night mode, controlling the terminal equipment to perform a communication connection according to a predetermined list and the user identification.

12. The terminal equipment of claim 11, wherein the operation of controlling the terminal equipment to perform the communication connection according to the predetermined list and the user identification comprises:
    determining whether the user identification is in the predetermined list;
    if the user identification is in the predetermined list, then allowing the terminal equipment to perform the communication connection; and
    if the user identification is not in the predetermined list, then prohibiting the terminal equipment from performing the communication connection.

13. The terminal equipment of claim 12, wherein before the operation of determining whether the user identification is in the predetermined list, the processor performs operations comprising:
    periodically counting call-in users within a time period and counting a call-in number of times and a communication time of each of the call-in users; and determining user identifications included in the predetermined list according to the call-in number of times and the communication time of each of the call-in users.

14. The terminal equipment of claim 12, wherein before the operation of allowing the terminal equipment to perform the communication connection, the processor performs operations comprising:
- detecting whether a front-end of the terminal equipment is performing a predetermined application;
- if the front-end of the terminal equipment is performing the predetermined application, generating a communication confirmation window and displaying the communication confirmation window in a current display interface;
- determining whether a user performs a confirmation operation through the communication confirmation window;
- if the user performs the confirmation operation through the communication confirmation window, then allowing the terminal equipment to perform the communication connection; and
- if the user does not perform the confirmation operation through the communication confirmation window, then prohibiting the terminal equipment from performing the communication connection.

15. The terminal equipment of claim 12, wherein after the operation of prohibiting the terminal equipment from performing the communication connection, the processor performs operations comprising:
- determining a user level corresponding the user identification;
- obtaining a predetermined response message and a call-in reminder period according to the user level;
- sending the predetermined response message to a terminal equipment of the user identification and start timing; and
- performing a call-in reminder for a user according to a timing period and the call-in reminder period.

16. The terminal equipment of claim 15, wherein a length of the call-in reminder period corresponding to a high priority of the user level is shorter than a length of the call-in reminder period corresponding to a low priority of the user level.

17. The communication control method of claim 5, wherein a length of the call-in reminder period corresponding to a high priority of the user level is shorter than a length of the call-in reminder period corresponding to a low priority of the user level.

* * * * *